(12) United States Patent
Heyer

(10) Patent No.: US 8,104,187 B2
(45) Date of Patent: Jan. 31, 2012

(54) WINDOW FRAME DEFLECTION MEASUREMENT DEVICE AND METHOD OF USE

(76) Inventor: Daniel Heyer, Lilburn, GA (US)

( * ) Notice: Subject to any disclaimer, the term of this patent is extended or adjusted under 35 U.S.C. 154(b) by 114 days.

(21) Appl. No.: 12/590,552

(22) Filed: Nov. 10, 2009

(65) Prior Publication Data

US 2011/0107609 A1    May 12, 2011

(51) Int. Cl.
*G01C 9/00* (2006.01)
*G01B 5/20* (2006.01)

(52) U.S. Cl. ............. 33/375; 33/374; 33/376; 33/533

(58) Field of Classification Search ............ 33/374–376, 33/832, 833, 501.05, 501.08, 501.09, 533, 33/548, 549, 551–555, 557, 560, 572
See application file for complete search history.

(56) References Cited

U.S. PATENT DOCUMENTS

| | | | | |
|---|---|---|---|---|
| 4,428,126 A | * | 1/1984 | Banks | 33/412 |
| 4,691,443 A | | 9/1987 | Hamilton et al. | |
| 4,718,173 A | * | 1/1988 | Eklund | 33/533 |
| 4,862,595 A | | 9/1989 | Drumright | |
| 4,894,920 A | * | 1/1990 | Butler et al. | 33/203.11 |
| 4,939,848 A | | 7/1990 | Armstrong | |
| 5,189,798 A | * | 3/1993 | La Force | 33/1 Q |
| 5,303,480 A | | 4/1994 | Chek | |
| 5,343,628 A | | 9/1994 | Ham | |
| 5,388,338 A | | 2/1995 | Majors | |
| 5,433,011 A | | 7/1995 | Scarborough et al. | |
| 6,041,510 A | | 3/2000 | Huff | |
| 6,442,857 B1 | * | 9/2002 | Atsuhiko et al. | 33/553 |
| 6,460,264 B1 | | 10/2002 | Bos et al. | |
| 6,497,047 B1 | * | 12/2002 | Miyagawa et al. | 33/533 |
| 6,550,152 B2 | * | 4/2003 | Myrick | 33/526 |
| 6,640,455 B1 | | 11/2003 | Smothers | |
| 7,497,022 B1 | | 3/2009 | Aarhus | |
| 7,743,525 B2 | * | 6/2010 | Zhang et al. | 33/533 |
| 2003/0033722 A1 | | 2/2003 | Lanham | |

* cited by examiner

*Primary Examiner* — Amy Cohen Johnson
(74) *Attorney, Agent, or Firm* — Schultz & Associates, P.C.

(57) ABSTRACT

A portable device for measuring deflection of a surface, comprising an elongate frame having a first end and a second end and a first datum surface, a first removable reference assembly adjacent the first end, a second removable reference adjacent the second end, a deflection gauge attached to the elongate frame between the first removable reference assembly and the second removable reference assembly, and wherein the deflection gauge engages and measures a deflection of the surface relative to the first removable reference assembly and the second removable reference assembly.

9 Claims, 5 Drawing Sheets

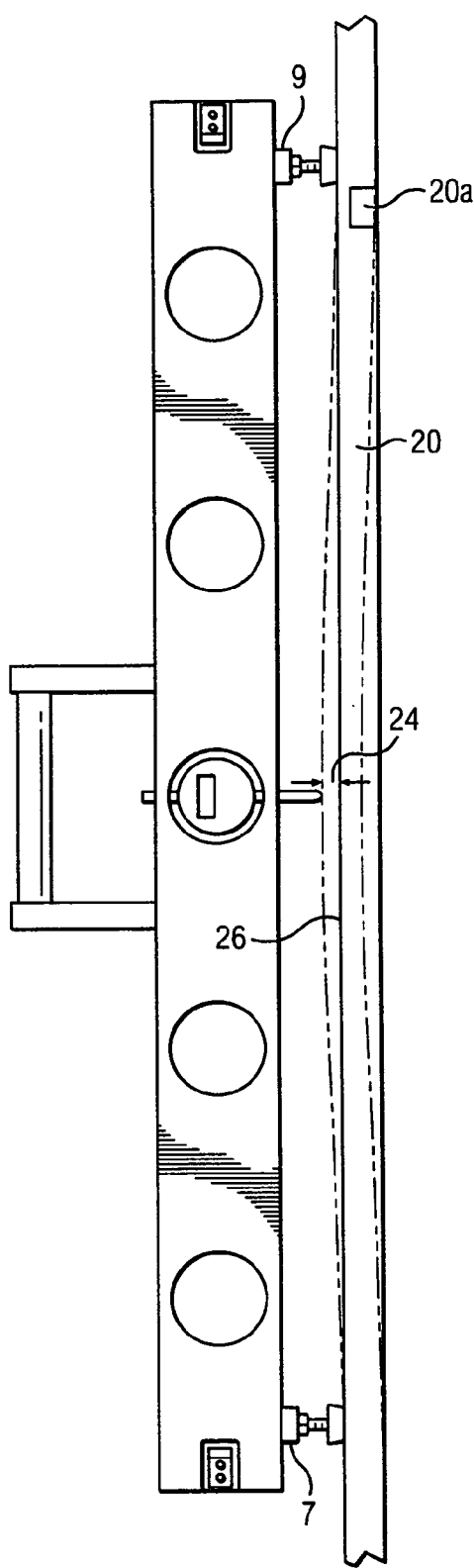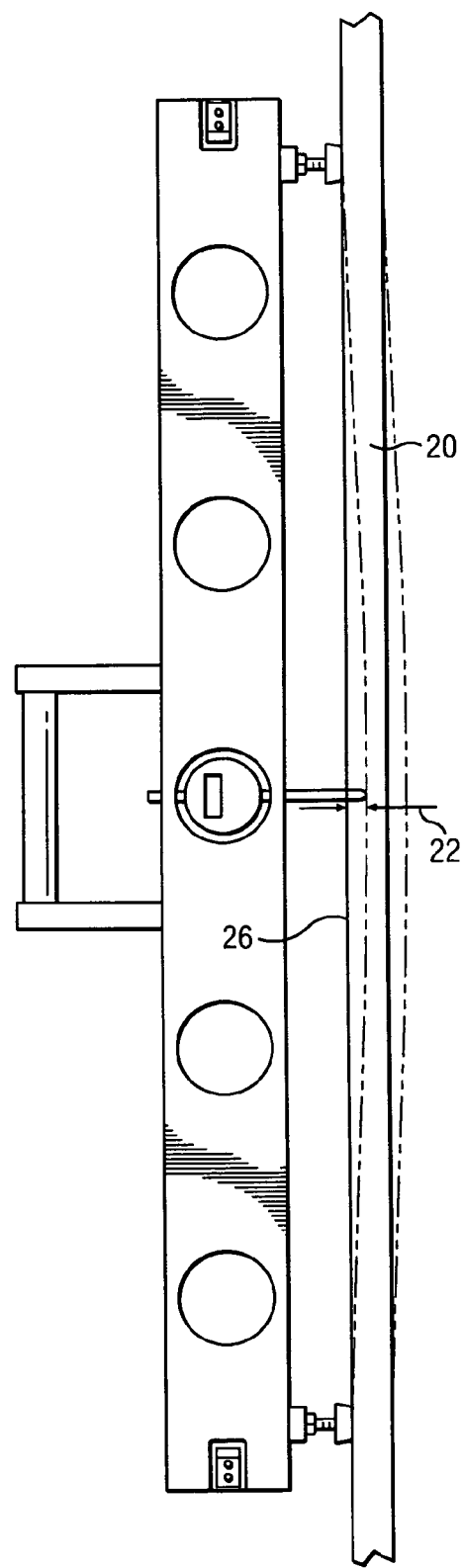
*FIG. 6A*  *FIG. 6B*

WINDOW FRAME DEFLECTION MEASUREMENT DEVICE AND METHOD OF USE

FIELD OF THE INVENTION

This invention relates generally to measurement of surface deflection of vertical surfaces and, more specifically, to measurement of deflection of a window or door frame.

BACKGROUND OF THE INVENTION

In many fields, it is often necessary to measure the amount that a vertical surface or frame has been bent or deflected. Such a situation arises in disaster recovery in response to wind damage or other accidents or natural disasters. Measurement of damage is necessitated by retrofit procedures which may be required as well as insurance recovery and insurance adjustment.

One of the major problems in measuring the deflection over longs spans, such as in large window frames, is the lack of convenient, portable tools to measure the deflection. A typical tool available is a masons bubble level as well known in the art. A bubble level determines whether a surface is level and plumb (truly vertical or horizontal), but does not quantify the deflection of the surface.

U.S. Pat. No. 5,388,338 to Majors discloses an expandable screed level. The level has an open rectangular cross section and uses liquid bubble levels to determine slope. The device is expandable by adding additional sections at either end. The additional sections attach by means of a smaller rectangular cross section that fits inside the main body. The additional sections are retained in position by use of a latching mechanism. However, Majors makes no provision for measuring the displacement of a warp in a frame.

U.S. Pat. No. 5,433,011 to Scarborough et al discloses an expandable level. The level is expandable as a straight level, a square, a T-square and other shapes. Additional sections are added to the main body through a tongue and groove arrangement. A pressure screw is tightened to lock the pieces together. The device measures slope through use of liquid bubble levels. Each expansion piece contains at least one level. However, no provision for measuring deflection of a frame is provided.

U.S. Pat. No. 4,939,848 to Armstrong discloses an improved alignment gauge to check misalignment of the body of a vehicle. The device determines the distance between various physical points on the vehicle in order to aid in proper alignment. The device consists of a needle indicator attached at one end of a beam. The beam supports a horizontal and vertical liquid bubble level. The invention produces a precise result, but does not address the problems of ease of transport and use. It does not measure deflection along a long linear surface, but rather at specific points.

U.S. Pat. No. 7,497,022 to Aarhus discusses an extendable level. Telescopic extensions are contained within a main body of the level extension. Each terminates in an end piece. The extensions are supported by cross members. Each cross member and the main body includes a liquid bubble level. The invention facilitates viewing but does not measure depth or deflection.

US 2003/0033722 to Lanham discloses a telescopic leveling instrument having a body and telescopic extensions. The telescopic extensions are oriented horizontally or vertically. The extensions are marked to allow distance measurement. The main body includes a bubble level. The device measures distance but does not measure depth or deflection perpendicular to the surface.

U.S. Pat. No. 5,303,480 to Chek discloses a device to measure the amount of deviation of a patient's facial symmetry from a "standardized norm." The device consists of a rod shaped base and a portable probe that is movable horizontally. The base is placed against a patient's sternum and maintained at horizontal by monitoring a liquid bubble level. The probe is then set against various facial features and the horizontal and radial distance from the sternum to the probe is measured. However, the device does not provide a means to measure depth between two points on a particular surface or over long distances. Further, the device is incapable of measuring multiple points of deflection at the same time.

U.S. Pat. No. 4,691,443 to Hamilton et al discloses a vehicle alignment system. The system includes fittings connected to beams that allow access to a vehicle, while maintaining the measurement surfaces in horizontal or vertical orientation. Lasers are used to project X, Y and Z coordinates. The device is not portable. The device also does not provide a means to measure deflection of a freestanding vertical beam.

U.S. Pat. No. 5,388,338 to Majors describes an extendable screed level. The level includes extensions that mount to a main body. The extensions enter a channel in the main body and are locked into position with releasable catches. The extensions produce an increase in length that allows the level to span retaining walls of various widths, forming a barrier to hold wet cement. The level of Majors includes a bubble level to ensure the surface of the wet cement is horizontal. However, Majors does not provide for determining a measurement of deflection of vertical surfaces.

Additionally, prior art does not address the problem in measuring deflection in a vertical beam by a single individual. Often the window frames are quite large, requiring spanning eight or more feet in order to determine the deflection. It is difficult and unwieldy for a single individual to hold prior art levels against such a window frame and measure the deflection accurately or consistently.

Therefore, a need exists for an economical device for measuring deflection of large surfaces, including window frames, which can be operated single-handedly. A need also exists for a deflection measurement device which is portable and may be used in the field. Still further, a need exists for a simple uncomplicated device to measure deflection of a vertical beam at or around its center point. A further need exists for a device which is expandable to fit both large and small spans, without the need for additional tooling or calibration. A still further need exists for a device to measure many points of deflection over a surface simultaneously between a pair of reference points.

SUMMARY OF THE INVENTION

The preferred embodiment includes a device and method for determining the deflection of a long freestanding vertical beam. A common use would be measuring the deflection of frames of large windows or doors.

One embodiment includes of an elongate frame having an adjustable reference assembly located at each end. A gauge is located centrally in the elongate frame and positioned to measure a deflection from two calibrated reference assemblies. A centrally located handle is provided for ease of use, allowing a single individual to hold the device and manipulate the measurement gauge.

Expansion sleeves are provided which can be attached precisely and rigidly to each end of the frame in order to expand the span of the device. The reference assemblies are then removed and placed at the end of the additional lengths. The reference assemblies are designed and constructed so that re-calibration is not required. Alternatively, the additional lengths incorporate additional pre-calibrated reference assemblies.

In another embodiment, the deflection at several locations along a given frame may be measured by repositioning the support frame, or, in another preferred embodiment, by several gauges simultaneously.

In use, the device is first calibrated. Then, the reference assemblies are positioned against a span of window frame or other surface by manipulation of the elongate frame. The gauge in the elongate frame provides a reading of deflection.

BRIEF DESCRIPTION OF THE DRAWINGS

Some of the features and benefits of the present invention having been stated, others will become apparent as the description proceeds when taken in conjunction with the accompanying drawings, in which:

FIGS. 6a and 6b show a side view of a preferred embodiment resting against a surface, shown in two deflection states.

DETAILED DESCRIPTION

The present invention now will be described more fully with reference to the accompanying drawings in which various embodiments are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout.

Figure 1:
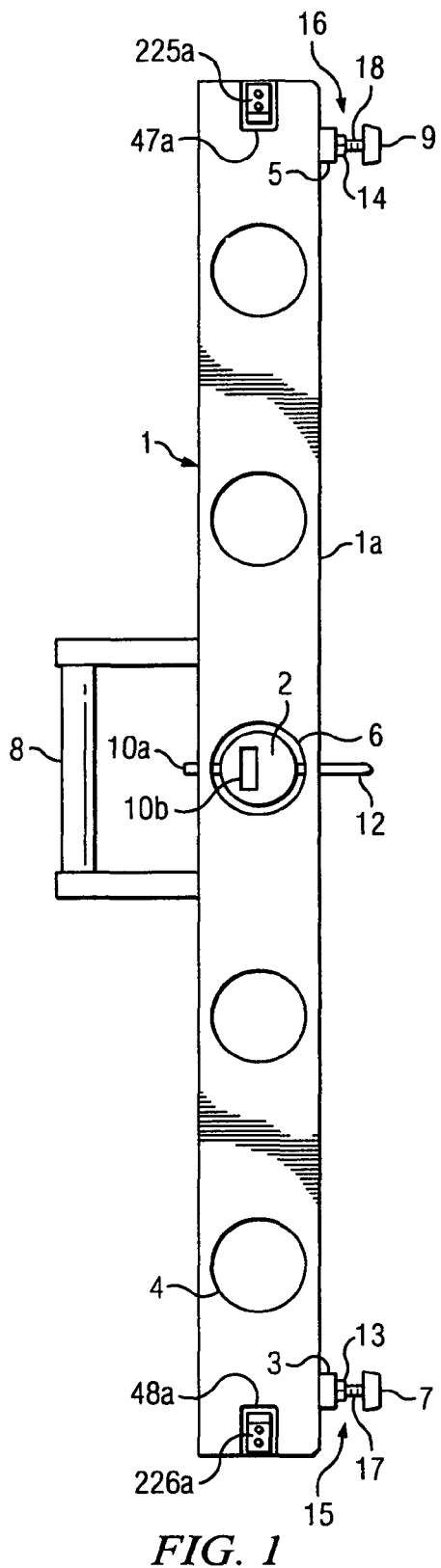
FIG. 1 is a side view of a preferred embodiment.
Figure 2:
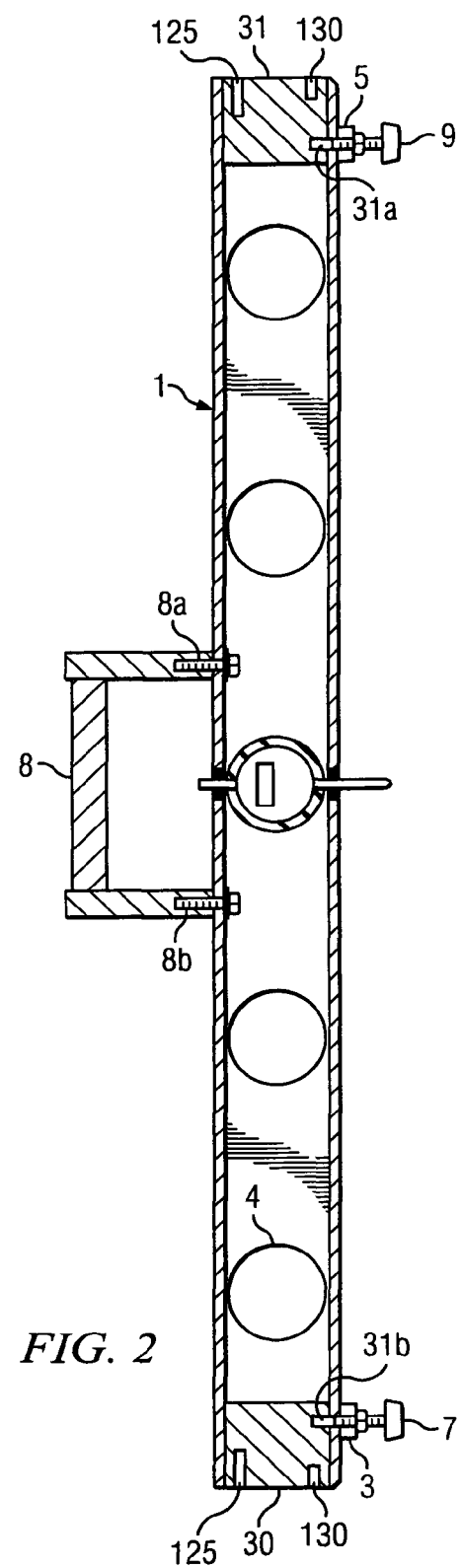
FIG. 2 is a cross sectional side view of a preferred embodiment.

Referring to FIGS. 1 and 2, the preferred embodiment includes elongate frame 1. Elongate frame 1 is a rectangular tube having a base length of approximately three feet. Bottom surface 1a of elongate frame 1 in the preferred embodiment is machined flat. The flat surface forms a first datum surface. End caps 30 and 31 are solid aluminum billets that are sized to fit precisely into the ends of the rectangular channel of elongate frame 1. In the preferred embodiment, the end caps are epoxied in place and machined flat and perpendicular to bottom surface 1a. Perpendicularity is important. In the preferred embodiment the end caps are generally perpendicular to bottom surface 1a. End caps 30 and 31 each contain holes 31a and 31b, sized so that threaded bolts 17 and 18 may extend into the end caps without interference (shown in detail in FIG. 3e). End caps further include guide holes 125 and 130. Recesses 47a and 48a are located at each end of elongate frame 1. Catch support 225a resides in recess 47a. Catch support 226a resides in recess 48a. Each catch support is secured to the elongate frame by way of retaining screws 235 and 240. Each catch support includes a catch 230 (shown in detail in FIG. 4).

Figure 5:
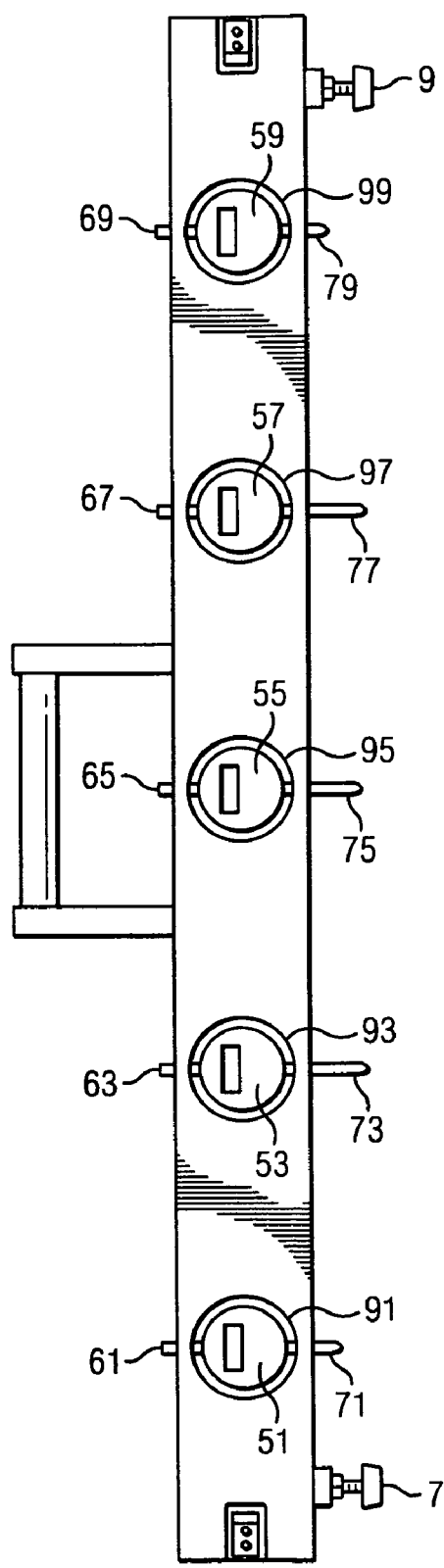
FIG. 5 is a side view of an alternative embodiment.

By way of example, FIG. 5 shows the construction of catch support 226a and catch 230 as well as the location of the retaining screws 235. Catch support 226a and catch 230 are formed from stamped steel plate in the preferred embodiment.

Returning to FIGS. 1 and 2, a number of weight reduction holes 4 pass through elongate frame 1. Center cavity 6 is supplied for mounting of gauge 2. Elongate frame 1 also includes a set of threaded holes for receiving mounting screws for a set of reference assemblies 15 and 16. The threaded holes are shown by way of example in FIG. 3e as 120 and 121.

Elongate frame 1 may be made from an extrusion, milled from stock or cast. An aluminum magnesium alloy is preferred for cost and weight considerations. However, elongate frame 1 may be constructed of other rigid materials capable of maintaining a very low central beam deflection for moderate to light loads, on the order of 25 pounds. Lighter weight materials are preferred. For extremely high precision applications, stainless steel or titanium may be employed, resulting in extremely low deflections over large spans. Cross sectional shapes can vary. In one preferred embodiment an "I" beam extrusion is employed having the highest rigidity to weight ratio available. Rectangular and box extrusions are also preferred as having high rigidity.

Handle 8 extends from the center of elongate frame 1. The handle is centrally positioned between the reference assemblies to provide equal pressure to the reference assemblies when in use and to facilitate ease of positioning by a single user. Handle 8 is attached to the elongate frame 1 using screws 8a and 8b passing through the inside of elongate frame 1 or by welding. Other methods of removable or permanent attachment may be employed as known in the art. A removable handle is preferred to aid in compact storage for shipment.

Elongate frame 1 includes two reference assemblies 15 and 16. Reference assemblies 15 and 16 include mounting blocks 3 and 5. The top surface of each mounting block (shown by example as 50 of FIG. 3f is machined flat to match the bottom surface 1a of the elongate frame. The flat surfaces form second and third datum surfaces from which the device is calibrated. The mounting blocks are removably attached to elongate frame 1 as shown with reference to FIGS. 1, 2, and 3e. The mounting blocks include holes 107 and 108. Bolts 52 and 54 pass through holes 107 and 108 in mounting blocks 3 and 5 and thread into holes 120 and 121 in end cap 31. Each mounting block includes a threaded hole shown as 17a for receiving a threaded contact support, shown as 18. The threaded contact support 18 is retained in threaded hole 17a by locking nut 14. The threads are standard ASTM pitch. In high precision embodiments, threads with lesser pitch may be employed.

Each reference assembly further includes contact pad, shown by example as 9. In the preferred embodiment, each contact pad includes a flexible neoprene gasket. In other embodiments requiring greater accuracy, each contact pad may be comprised of a suitable rigid material such as nylon, delrin, aluminum or polished stainless steel. In applications where static discharge or contact with high voltage is a concern, the contact assemblies can be formed of bakelite or asbestos.

Returning to FIGS. 1 and 2, Gauge 2 is operatively positioned in mounting hole 6. Gauge 2 includes deflection probe 12, retention knob 10a and data read out 10b. Probe 12 extends radially from the bottom of gauge 2 through access hole 12a in elongate frame 1. Hole 12a is sized to avoid interference with the radial movement of probe 12. Similarly, retention knob 10a extends radially through access hole 12b in the top of elongate frame 1. Access hole 12b is sized to allow free motion of the retention knob. Probe 12 is spring loaded to facilitate ease of use. Retention knob 10a follows the movement of probe 12. Retention knob 10a secures probe 12 to gauge 2 preventing over-extension or loss of probe 12 due to the spring.

Gauge 2 in the preferred embodiment is a 543-683B electronic digital indicator manufactured by Mitutoyo of Tokyo, Japan. Another viable option is a depth gauge manufactured under part number CEN44345 and offered for sale by Central Tools/Central Lighting. In another preferred embodiment, the gauge can include an electronic memory including time and date indexing so that the time and date of measurements taken can be recorded. Furthermore, gauge 2 may include a memory for alphanumeric tagging of each measurement so that notes may be made as to the location of the window frame being measured. In this embodiment, electronic downloading of this data is provided to a laptop computer for later use. An RFID tag may be applied to the physical window frame corresponding to the deflection tagging for later positive location and correlation with the deflection measurement.

Additionally, gauge 2 may be an optical or acoustic distance measuring device. An example of an optical measuring device is Leica Disto's model 740690, which measures distance via a laser. An example of an acoustic measuring device is the Intellimeasure model 77-018 from Stanley Tools, which measures distance via ultrasonic waves. Other such measuring devices are known in the art and may include wireless data capture via a computer. Gauge 2 may also include a button to zero the readout at a given height during calibration.

FIGS. 3a-3d and 4 show features extensions 100, 105 and 110. In the preferred embodiment, the extensions are different lengths of 3 inches, 6 inches and 12 inches, respectively. Other lengths of extensions may be utilized. The extensions are attached to the elongate frame singularly or in groups, thereby variably extending the length spanned by the device. Extensions 100, 105 and 110 are constructed of hollow rectangular channel having solid ends 101a and 101b, 106a and 106b, and 111a and 111b. The solid ends are epoxied into each end of each extension, respectively. Bottom surfaces 1009, 1089 and 1109 are each machined flat to match bottom surface 1a of elongate frame 1. The bottom surfaces form datum surface for calibration. Each solid end is also machined to be perpendicular with the bottom surfaces.

Each extension includes a set of guide pins 115 and 120 and a set of guide holes 116 and 121. Guide holes 116 and 121 are sized to provide a close fit with guide pins 115 and 120. Guide pins 115 and 120 are different diameters and different lengths so that the extensions may be assembled with the elongate frame in the proper orientation.

In an alternate embodiment, each extension includes a pre-calibrated reference assembly as previously described in relation to elongate frame 1.

Figures 3A, 3B, 3C:
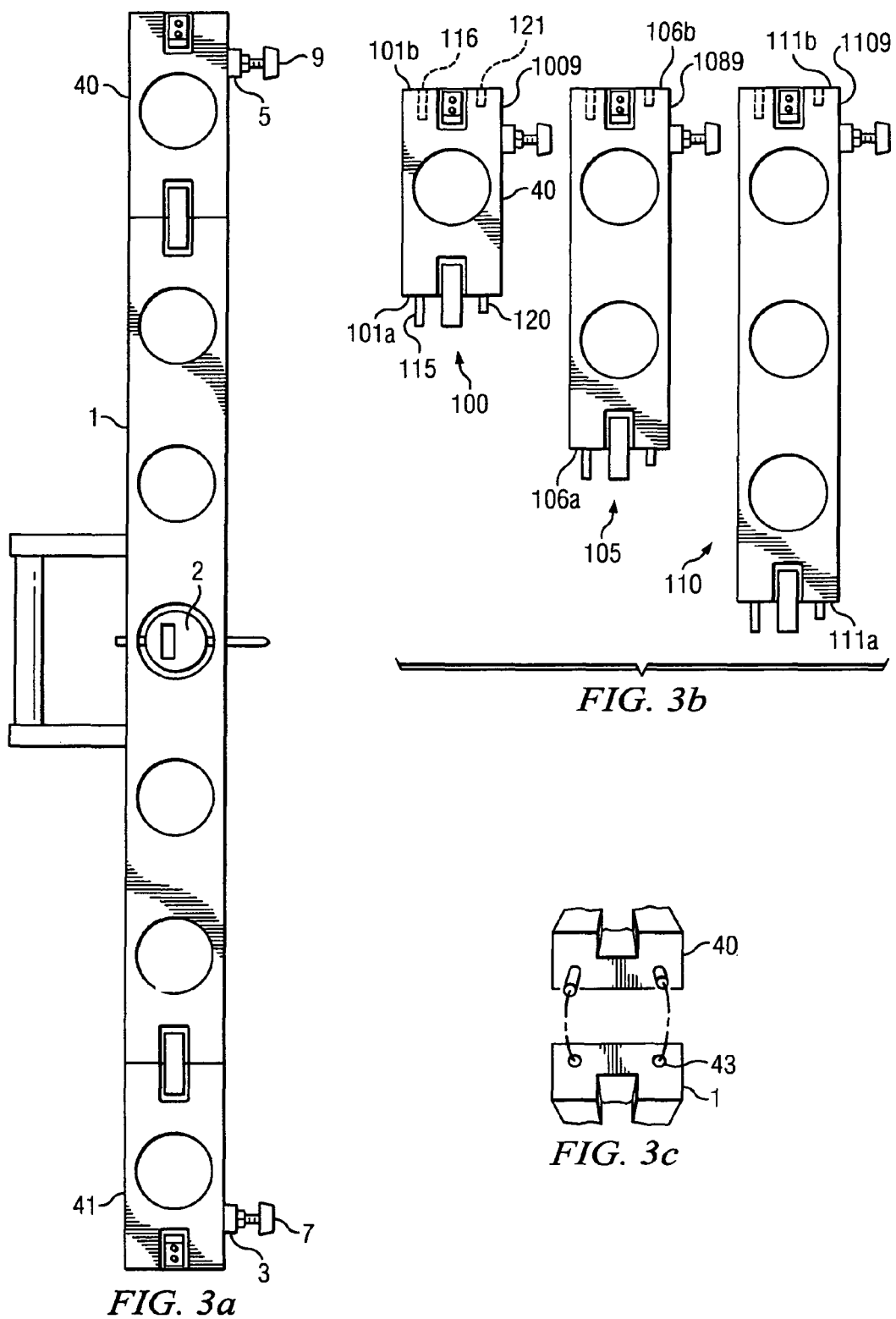
FIG. 3a is a side view of a preferred embodiment that includes expansion sleeves.
FIG. 3b is a side view of several expansion sleeves of different lengths.
FIG. 3c is an assembly view of the elongate frame and an expansion sleeve.
Figure 3D:
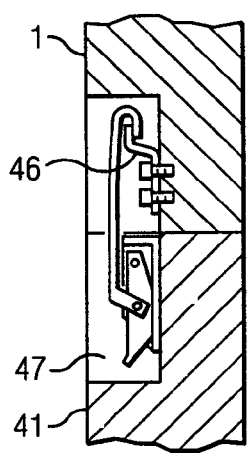
FIG. 3d is a partial cross-sectional view of the elongate frame and an expansion sleeve.
Figure 3E:
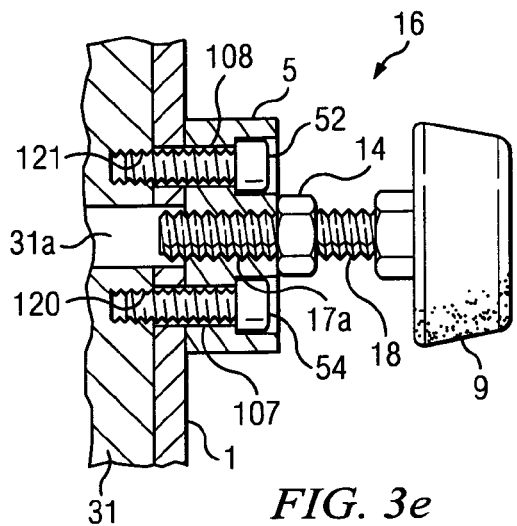
FIG. 3e is a partial cross-sectional view of the adjustable reference assembly.
Figure 3F:
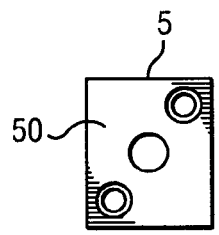
FIG. 3f is a top view of a mounting block.
Figure 4:
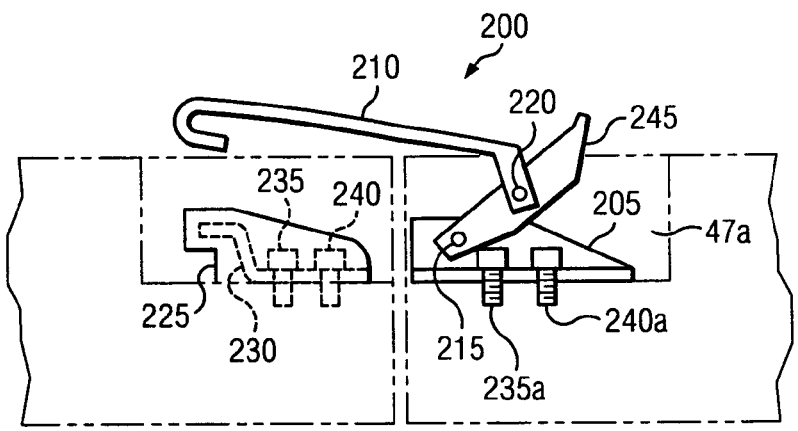
FIG. 4 is a detailed view of a latch mechanism.

As shown in reference to FIGS. 3d and 4, toggle support 205 resides in recess 47a located on each extension. Toggle support 205 is secured in recess 47a with bolts 235a and 240a. Toggle arm 245 is pivotally supported by toggle support 205 through hinge pin 215. Toggle arm 245 includes toggle pin 220 which pivotally supports latch 210.

In situations where a vertical surface has been deflected in more than one plane and/or in more than one location, additional deflection measurements must be taken. FIG. 5 shows an alternate embodiment which accomplishes this goal. In this embodiment, gauges 51, 53, 55, 57, and 59 reside in holes 91, 93, 95, 97, and 99, respectively. Each gauge includes a retention knob 61, 63, 65, 67, and 69, respectively, and a probe 71, 73, 75, 77, and 79, respectively. In use, once contact pads 7 and 9 have been positioned, readings from each of the gauges may be taken and recorded simultaneously.

The span of the invention may be increased by adding extensions 40, 41 at each end of elongate frame 1. In this case, the guide pins are engaged with corresponding guide holes until one or more extensions meets elongate frame 1. In order to removably engage an extension with the elongate frame, toggle arm 245 is advanced allowing latch 210 to engage catch 230. Toggle arm 200 is then rotated forcing latch 210 under catch support 225, thereby releasably securing the extension to the elongate frame. The mounting blocks, along with the contact assemblies 15 and 16 are removed from elongate frame 1 and attached to extension 40 by use of threaded bolts 52 and 54. Movement of contact supports 17 and 18 with respect to mounting blocks 3 and 5 is not required and their calibrated height is retained by locking nut 14. Thus relocation of contact assemblies 15 and 16 onto the extension without recalibration of gauge 2 is accomplished. Other extensions are added in a similar manner.

Before use, the device must be calibrated. To calibrate the device, contact pads 7 and 9 are positioned on a flat calibration surface. A gauge block of known height, typically half of the probe's travel distance, is placed on the flat calibration surface and under the machined bottom surface 1a of elongate frame 1. Contact supports 17 and 18 are adjusted until elongate frame 1 comes to rest on the gauge block. Probe 12 of gauge 2 is spring loaded and provides a measurement of deflection when contact pads 7 and 9 come to rest against the surface. Gauge 2 is adjusted so that the gauge provides a neutral reading of the calibration surface. If additional contact assemblies are included on the extensions, they are attached to elongate frame 1 and calibrated in a similar fashion.

Alternatively, the gauge blocks may be replaced by a measurement device. A measurement device, such as a machinist square or a set of calipers is used to determine the distance between contact pads 7, 9 and machined bottom surface 1a. Pads 7 and 9 are then placed against a flat calibration surface and gauge 2 is zeroed against the surface. Alternatively a measuring device may be used to set probe 12 at the same distance as pads 7 and 9. Probe 12 is then zeroed.

FIGS. 6a and 6b show an embodiment of the invention in use. The device is positioned on a vertical, free standing surface, such as frame 26. Contact pads 7 and 9 are located at the extremities of the vertical surface and positioned by manipulating the elongate frame by the handle. Spring loaded probe 12 meets frame 26 prior to either contact pad 7 or 9. As contact pads 7 and 9 move toward the surface, gauge 2 makes a measurement. Generally, the device will be located so that probe 12 meets frame 20 in the center, as this is often the area of greatest deflection. However, the device may be used to measure multiple locations along frame 26.

Where gauge 2 has been properly calibrated, a positive displacement reading will show a deflection of frame 20 inward 22 (away from the device), a negative reading will show a deflection outward 24 (toward the device) and a reading of zero will show no deflection. Where an RFID tag 20a is to be employed, it is affixed to frame 20 and its serial number is recorded and correlated with the deflection reading.

While preferred embodiments of this device are described as having a manually adjustable gauge, other gauges and measurement devices may be utilized. Further, seals for moving parts are not required for all uses and types of gauges.

Finally, zeroing of the gauge and extensions may be accomplished utilizing many methods without departing from the intent and scope of the invention.

In the drawings and specification, there have been disclosed embodiments of the invention and, although specific terms are employed, they are used in a generic and descriptive sense only and not for the purpose of limitation.

The invention claimed is:

1. A portable device for measuring a deflection of a surface, comprising:
   an elongate frame having a first end, a second end, a first datum surface, and a plurality of weight reduction holes;
   a first removable reference assembly having a first contact support adjustable relative to a second datum surface on the first reference assembly, adjacent the first end;
   a second removable reference assembly having a second contact support adjustable relative to a third datum surface on the second reference assembly, adjacent the second end;
   a deflection gauge attached to the elongate frame between the first removable reference assembly and the second removable reference assembly; and
   wherein the second datum surface and the third datum surface are adjacent the first datum surface and wherein the deflection gauge engages and measures the deflection of the surface relative to the first removable reference assembly and the second removable reference assembly.

2. A portable device for measuring a deflection of a surface, comprising:
   an elongate frame having a first end and a second end and a first datum surface;
   a first extension having a fourth datum surface, attached to the first end of the elongate frame;
   a second extension having a fifth datum surface, attached to the second end of the elongate frame;
   a first removable reference assembly attached to the first extension;
   a second removable reference assembly attached to the second extension;
   a deflection gauge attached to the elongate frame between the first removable reference assembly and the second removable reference assembly;
   wherein the fourth datum surface and the fifth datum surface are adjacent to and match the first datum surface and wherein the deflection gauge engages and measures the deflection of the surface relative to the first removable reference assembly and the second removable reference assembly.

3. The device of claim 2 wherein the first extension includes a first coupling means for engaging the elongate frame to orient the first removable reference assembly relative to the deflection gauge and wherein the second extension includes a second coupling means for engaging the elongate frame to orient the second removable reference assembly relative to the deflection gauge.

4. The device of claim 3 comprising a third extension having a sixth datum surface attached to the first extension and a fourth extension having a seventh datum surface attached to the second extension and wherein the sixth datum surface is adjacent the fourth datum surface and the seventh datum surface is adjacent the fifth datum surface.

5. A portable device for measuring deflection of a surface, comprising:
   an elongate frame having a first end and a second end and a first datum surface;
   a first removable reference assembly adjacent the first end;
   a second removable reference assembly adjacent the second end;
   a deflection gauge attached to the elongate frame between the first removable reference assembly and the second removable reference assembly;
   a first extension having a third reference assembly, removably coupled to the elongate frame;
   a second extension having a fourth reference assembly, removably coupled to the elongate frame, and
   wherein the deflection gauge is calibrated relative to the third reference assembly and the fourth reference assembly and wherein the deflection gauge engages and measures a deflection of the surface relative to the first removable reference assembly and the second removable reference assembly.

6. A method for measuring deflection of a surface, utilizing a portable device for measuring deflection comprising: an elongate frame member, a first foot attached to the elongate frame member, a second foot attached to the elongate frame member, a measuring tool attached to the elongate frame member between the first foot and the second foot, a first extension having a foot and attachable to the elongate frame member, a second extension having a foot and attachable to the elongate frame member; the method comprising the steps of:
   attaching the first extension to the elongate frame member;
   attaching the second extension to the elongate frame member;
   holding the portable device;
   placing the foot of the first extension and the foot of the second extension against the surface;
   operating the measuring tool to determine deflection of the surface.

7. The method of claim 6 further comprising the step of zeroing the measuring tool.

8. The method of claim 7 wherein the step of zeroing the measuring tool further comprises the steps of:
   placing the foot of the first extension and the foot of the second extension against a known flat surface;
   adjusting the foot of the first extension and the foot of the second extension, so that the elongate frame member is parallel with the known flat surface; and,
   measuring a distance to the known flat surface using the measuring tool.

9. The method of claim 7 wherein the step of zeroing the measuring tool further comprises the steps of:
   placing the foot of the first extension and the foot of the second extension against a known flat surface;
   adjusting the foot of the first extension and the foot of the second extension, so that the elongate frame member is parallel with the known flat surface;
   lowering the measuring tool to rest against the known flat surface; and
   adjusting the measuring tool to read zero as it rests against the known flat surface.

* * * * *